United States Patent Office 2,744,286
Patented May 8, 1956

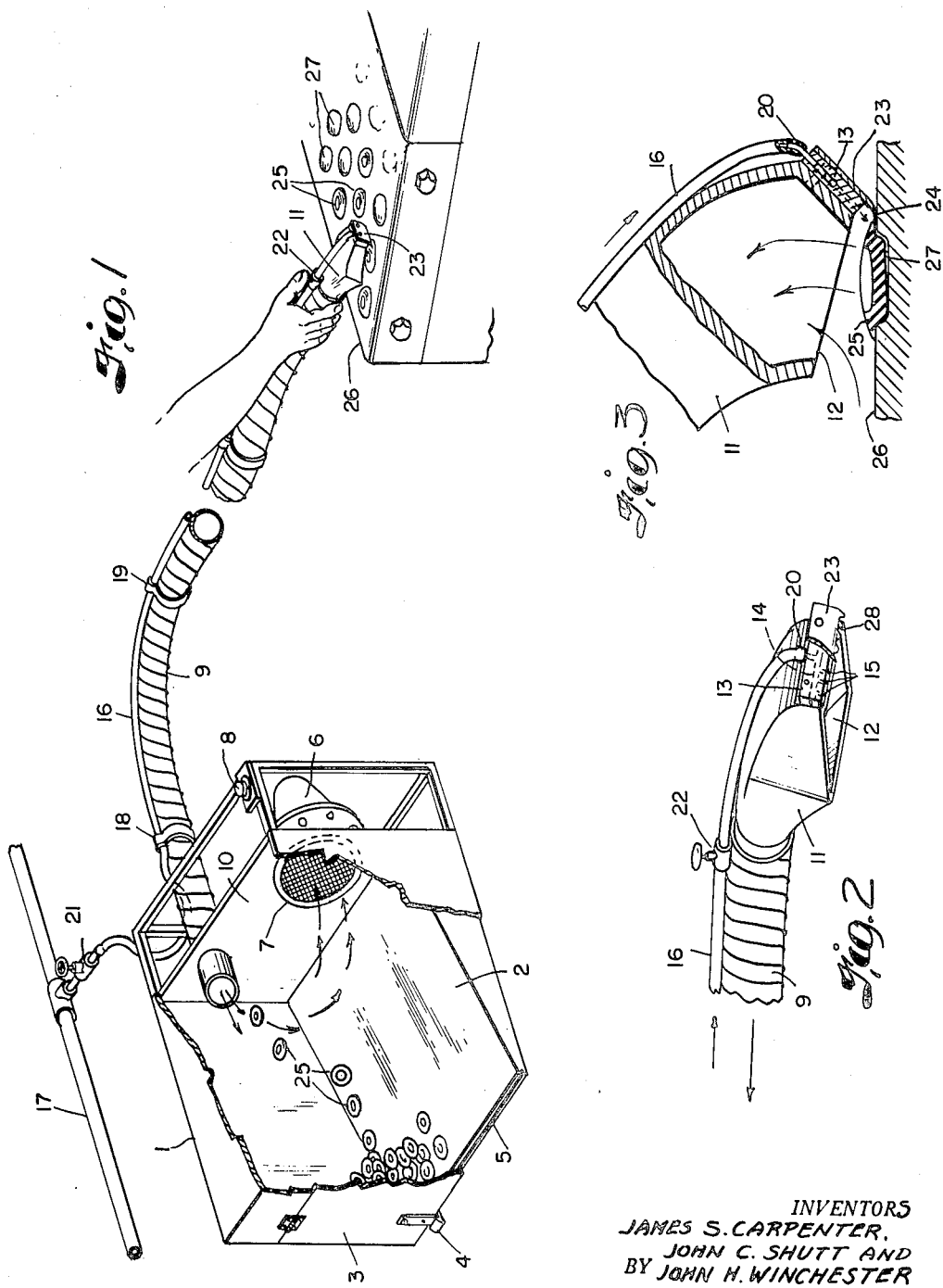

2,744,286

REMOVAL OF MOLDED ARTICLES

James S. Carpenter, Chardon, John C. Shutt, Wickliffe, and John H. Winchester, Euclid, Ohio, assignors, by mesne assignments, to The Eagle-Picher Company, Cincinnati, Ohio, a corporation of Ohio Application October 26, 1951, Serial No. 253,435

10 Claims. (Cl. 18—2)

This invention relates as indicated to the removal of molded articles from their molds, and especially to the removal of molded rubber and like plastic articles from the mold cavities in the platens of molding or vulcanizing presses.

A great variety of articles is produced by molding various rubber and plastic compositions in molds formed by complementary platens as illustrated, for example, in Winegar et al. Patent 2,171,511. Typical molded articles include bicycle handle bar grips, vibration damping motor mounts, vibration insulators, self-aligning bearing mounts, and innumerable other semi-rigid molded articles. A great many of these articles are of fairly small size, making it convenient and efficient to provide a number of complementary mold cavities in the mating platens of the press so that a plurality of the articles may be produced in a single molding and vulcanizing or curing operation. When the press is opened, the molded articles ordinarily are retained in the mold cavities of one such platen and must be removed before such cavities can be cleaned and coated with a parting compound preliminarily to again loading the molds with slugs of the molding composition. In some cases, the finished articles are relatively easily dislodged from the mold cavities but in many cases considerable difficulty may be encountered in dislodging and removing the same due either to the shape of the articles or a tendency of the same to stick to the walls of the cavities. It has been a common practice for the operator to employ a wooden scraper or prying tool thus to dislodge such articles. This is often a rather time-consuming operation, resulting in unnecessary "down time" of the press and further time is usually lost when dislodged articles fall to the floor and must thereupon be gathered up and collected. In fact, in the case of the more resilient rubber articles of small size, such articles tend to roll and bounce in all directions so that it may be quite a problem to recover the same and some become objectionably dirtied in the process.

It is accordingly a principal object of our invention to provide means whereby molded articles may readily be dislodged and removed from their respective mold cavities with a minimum of time and loss, and such articles collected in an appropriate container.

Another object is to provide a method of removing molded articles from the cavities of mold platens and the like which will be expeditious and cleanly.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a diagrammatic perspective view illustrating the manner in which the apparatus of our invention may be utilized thus to remove such molded articles;

Fig. 2 is a detail perspective view of the article dislodging and collecting head or tool; and Fig. 3 is an enlarged detail view in cross-section of such head or tool illustrating the manner of operation of the same.

Referring now more particularly to said drawing, we provide a closed chamber or container 1 having a sloping floor or bottom 2 and a hinged door 3 provided with a latch 4 and a seal 5. As shown in Fig. 1, a suction fan 6 is mounted at the other end of container or cabinet 1 from door 3 adapted to draw air through large screened opening 7 to create a partial vacuum within such cabinet. A switch 8 may be provided adjacent such fan to energize the electric motor (not shown) driving the same.

A length of flexible tubing 9 which may desirably be of the well-known type having tape or fabric walls reinforced by a helical wire member, since this affords a relatively lightweight construction, enters such cabinet through the same wall 10 provided with screened opening 7 but desirably at a point well spaced from the latter and projecting somewhat into the cabinet as shown. A suction head or mouth member 11 is secured to the free end of such tubing 9, ordinarily formed of sheet metal or relatively rigid molded plastic composition. In the embodiment illustrated, the mouth proper 12 is rectangular in shape and directed generally at right angles to the body of the tubing 9 for convenient manipulation.

Secured to the outer lip of such suction head adjacent the mouth thereof is an air jet nozzle 13 which may desirably be of plastic material cored to provide a manifold 14 leading to a plurality of air jet orifices 15 directed in the same general direction as mouth 12 of member 11. A length of flexible rubber tubing 16 leading from air line 17 is conveniently attached to tubing 9 as at 18 and 19 and connects to such nozzle at 20. A fitting and valve 21 may be provided at air line 17 for admitting air pressure to tubing 16 and a small, normally closed, spring-backed valve 22 provided in tubing 16 adjacent suction head 11 for convenient manual operation as shown in Fig. 1.

Affixed to nozzle 13 is a protruding lip or pry member 23 desirably projecting somewhat beyond such nozzle and having a tapered and slightly hooked edge or end portion 24 adapted to engage molded articles to dislodge the same from their respective mold cavities as shown, for example, in Fig. 3. Such pry member 23 may be of sheet metal, wood, or appropriate plastic material.

When the mold press has been opened exposing the molded articles 25, the operator will run our new tool over the surface of the platen 26 engaging such articles with the protruding lip 24 at least partially to dislodge such articles from their respective cavities 27. Simultaneously he presses valve 22 to cause jets of air under pressure to be delivered through orifices 15 of nozzle 13 which enter the interstices thus formed between the articles and the walls of their respective mold cavities to complete the separation of the articles therefrom, whereupon the latter are at once picked up by the closely overlying suction head 11 and conveyed through tubing 9 to cabinet 1. No delay is involved in removing recalcitrant articles nor is time lost searching for articles which have fallen to the floor as when prior art procedures have been employed. When all of the molded articles have been removed from the platen, the latter is immediately cleaned, sprayed with the usual parting compound and slugs or rubber or other molding composition placed in the cavities preparatory to a repetition of the molding cycle with a minimum of down time. When a sufficient quantity of the molded articles have accumulated in cabinet 1, fan 6 will be stopped and door 3 opened to remove the collected articles.

As shown in Fig. 2, the projecting lip of the scraper or prying member 23 may be notched as at 28 to facilitate engagement with the molded articles to dislodge the latter and also, in the case of some such articles, to facilitate entry of the jets of air into the interstices between such articles and the walls of their respective cavities. Various modifications of our suction head and air jet nozzle will be apparent to those skilled in the art and come within the scope of the present invention. Although we find it convenient to cause the mouth 12 of the suction head to be turned more or less at right angles to the body of tubing 9, it may instead be generally axially of such tubing or at a different angle as found most convenient for the particular installation. A single cabinet 1 may be provided with a plurality of collecting elements connected thereto, and each such connecting element will generally serve a plurality of molding presses. Where a vacuum line is available in the plant, the same may be connected to cabinet 1 instead of providing individual fan units 6 as shown. Nozzle 13 may itself project beyond the mouth 12 of suction head 11 and serve as a mechanical prying and scraping element, but it is preferred to employ a lip member 23 as shown. In some cases, of course, depending upon the particular type of molded article and the tendency of the latter to stick in the mold cavity, it may not be necessary to utilize the air jet since the mechanical prying action of lip 24 and the suction of suction head 11 together may suffice to dislodge and remove the article. In the case of particularly recalcitrant articles, however, it will be seen that such article may be subjected simultaneously to a mechanical prying action, suction upon the upper surface of such article and an air jet or jets interposed between such article and the surface of the mold cavity. This cooperative action has been found extremely efficient in practice and the clearing of the mold has been greatly expedited with the result of considerably increasing the daily production of each molding press.

If desired, a metal basket may be placed in cabinet 1 to receive the molded articles discharged from the inner end of tube 9, and various other types of receptacles may be utilized.

With some types of molded articles and where quite high pressure air is available for the air jet nozzle, the employment of the scraper or pry element may not be necessary. It is important, however, that the air jet nozzle be mounted at one side of the suction mouth and directed in the same general direction as the latter. When utilizing the scraper, as will ordinarily be done, the air jet associated therewith will be directed in the same general direction in which such scraper protrudes. A thin, curved edge or end on such scraper, as shown, projecting transversely of the mouth of the suction head is generally advantageous in engaging and dislodging the molded articles.

Other modes of applying the principle of the invention may be employed, change being made as regards the details described, provided the features stated in any of the following claims or the equivalent of such be employed.

We therefore particularly point out and distinctly claim as our invention:

1. The method of removing semi-rigid molded articles from within mold cavites which comprises mechanically partially dislodging such article from its respective mold cavity, and simultaneously directing a jet of compressed air into the interstice thus formed between such article and the wall of such cavity while subjecting the body of such article to the pull of suction thereby completely to dislodge and remove such article from such cavity.

2. The method of removing semi-rigid molded articles from within mold cavities which comprises directing a jet of compressed air between such article and the wall of its respective mold cavity while simultaneously subjecting the body of such article to the pull of suction to draw such article from such cavity.

3. Apparatus for the removal of molded articles from molds comprising a closed chamber, a door to said chamber adapted when closed tightly to seal the latter, means operative to induce a partial vacuum in said chamber, flexible tubing communicating at one end with the upper portion of said chamber and extending therefrom, a rigid suction mouth member at the other end of said tubing, an outwardly protruding lip on said member at one side of said mouth adapted to pry such articles to dislodge the same from their respective mold cavities, an air jet nozzle on the lip side of said member directed in the same direction as said lip, and air line leading to said nozzle secured to said flexible tubing, and manually operable valve means for said air line adjacent said nozzle.

4. Portable apparatus for the removal of molded articles from molds comprising a length of flexible tubing having a suction mouth at one end, means operative to apply suction at the other end of said tubing, an outwardly projecting protuberance adjacent such mouth adapted to pry such articles to dislodge the same from their respective mold cavities, and an air jet nozzle mounted adjacent said protuberance and directed in the same direction parallel to the latter to deliver a jet of air into an interstice between such article and the wall of such cavity resulting from such prying action.

5. A tool of the character described comprising a portable suction head, a pry member mounted on said head and protruding beyond the mouth of the latter, and an air jet nozzle mounted on said head adjacent said pry member and directed in the same general direction parallel thereto.

6. A tool of the character described comprising a portable suction head, a pry member mounted on said head and protruding beyond the mouth of the latter, and an air jet nozzle mounted on said head between such mouth and pry member and directed in the same general direction in which said member protrudes.

7. A tool of the character described comprising a portable suction head having an open suction mouth, air jet means mounted on said head adjacent one side of such mouth and directed in the same general direction, said jet means extending along such side of such mouth and adapted to deliver a narrow blast of air generally parallel thereto, and an elongated scraper element carried by said head projecting beyond such mouth on the other side of said jet means and generally parallel to said jet.

8. A tool of the character described comprising a portable suction head having an open suction mouth, air jet means mounted on said head adjacent one side of such mouth and directed in the same general direction, said jet means extending along such side of such mouth and adapted to deliver a narrow blast of air generally parallel thereto, and an elongated serrated scraper element carried by said head projecting beyond such mouth on the other side of said jet means.

9. A tool of the character described comprising a portable suction head having an open suction mouth, a thin scraper element on said head adjacent such mouth and protruding therebeyond, and air jet means on said head at the same side of such mouth as said scraper element and directed in the same general parallel direction as the latter.

10. A tool of the character described comprising a portable suction head having an open suction mouth, a scraper element on said head adjacent such mouth and protruding therebeyond, the protruding end of said scraper element being turned generally transversely of such mouth, and air jet means on said head at the same side of such mouth as said scraper element and directed in the same general parallel direction as the latter.

References Cited in the file of this patent

UNITED STATES PATENTS

| | | |
|---|---|---|
| 646,490 | Deery | Apr. 3, 1900 |
| 789,768 | Sullivan | May 16, 1905 |
| 1,567,007 | Raiche | Dec. 22, 1925 |
| 1,654,727 | Green et al. | Jan. 3, 1928 |
| 2,301,617 | Cox et al. | Nov. 10, 1942 |
| 2,508,204 | Weber et al. | May 16, 1950 |